(12) United States Patent
Lee et al.

(10) Patent No.: US 12,515,496 B2
(45) Date of Patent: Jan. 6, 2026

(54) INTEGRATED THERMAL MANAGEMENT SYSTEM

(71) Applicants: Hyundai Motor Company, Seoul (KR); Kia Corporation, Seoul (KR)

(72) Inventors: Sang Shin Lee, Suwon-si (KR); Ki Mok Kim, Busan (KR); Man Ju Oh, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 177 days.

(21) Appl. No.: 18/516,467

(22) Filed: Nov. 21, 2023

(65) Prior Publication Data

US 2024/0375484 A1 Nov. 14, 2024

(30) Foreign Application Priority Data

May 10, 2023 (KR) .................. 10-2023-0060637

(51) Int. Cl.
*B60H 3/00* (2006.01)
*B60H 1/00* (2006.01)
*B60H 1/14* (2006.01)

(52) U.S. Cl.
CPC ......... *B60H 1/143* (2013.01); *B60H 1/00278* (2013.01); *B60H 1/00885* (2013.01); *B60H 2001/00307* (2013.01)

(58) Field of Classification Search
CPC ............... B60H 1/143; B60H 1/00278; B60H 1/00885; B60H 2001/00307
USPC ........................................................ 165/43
See application file for complete search history.

(56) References Cited

FOREIGN PATENT DOCUMENTS

| CN | 110576717 A | * | 12/2019 |
| CN | 115871411 A | * | 3/2023 |
| KR | 10-2014-0147365 | | 12/2014 |
| WO | WO2019212275 A1 | * | 11/2019 |

* cited by examiner

*Primary Examiner* — Davis D Hwu
(74) *Attorney, Agent, or Firm* — Fish & Richardson P.C.

(57) ABSTRACT

A refrigerant circuit includes an auxiliary heat exchanger for adjusting the temperature of refrigerant, a compressor, a condenser, an expansion valve, and an evaporator. The auxiliary heat exchanger selectively operates through a plurality of switch valves. Thus, the temperature of the refrigerant is efficiently managed according to situations, thereby improving cooling and warming performance. An integrated thermal management system includes the auxiliary heat exchanger configured to exchange heat with outside air, thereby efficiently managing the temperature of the refrigerant and simplifying the structure thereof.

17 Claims, 13 Drawing Sheets

INTEGRATED THERMAL MANAGEMENT SYSTEM

CROSS REFERENCE TO RELATED APPLICATION

The present application claims priority of Korean Patent Application No. 10-2023-0060637, filed on May 10, 2023, the entire contents of which are incorporated herein for all purposes by this reference.

TECHNICAL FIELD

The present disclosure relates to an integrated thermal management system and, more particularly, an integrated thermal management system that additionally includes a heat exchanger for adjusting the temperature of refrigerant and selectively operates the heat exchanger to efficiently manage the temperature of the refrigerant, depending on situations, thereby improving cooling and warming performance.

BACKGROUND

An increasing demand for environment-friendly vehicles, such as electric vehicles, has been a trend in recent years due to environmental issues with existing internal combustion engine-equipped vehicles. For existing internal combustion engine-equipped vehicles, there is no need for energy for separate warming because air heated by waste heat of an engine is circulated into an occupant space in the vehicle. In contrast, for electric vehicles, there is a need for energy for separate warming because a heat source is not available such as the engine. Thus, there occurs a problem in that the fuel efficiency is decreased. The decrease in the fuel efficiency results in a decrease in the distance the electric vehicle travels, thereby causing inconveniences, such as the need to frequently charge a vehicle battery.

Vehicle electrification has additionally created the need for heat management of not only a vehicle occupant space, but also a high-voltage battery and electric-device components, such as a motor. That is, the vehicle occupant space, the high-voltage battery, and the electric-device components of the electric vehicles and the like have different air-conditioning needs. Therefore, technologies are required for maximally saving energy through efficient cooperation among them while individually meeting their respective air-conditioning needs. Accordingly, the concept of integrated thermal management has been proposed in order to increase thermal efficiency by individually performing thermal management of the vehicle occupant space, the high-voltage battery, and the electric-device components of the electric vehicles, but integrating overall vehicle thermal management.

A refrigerant circulation module of the electric vehicle for indoor air-conditioning has to circulate refrigerant by utilizing electric energy. A problem with the existing refrigerant circulation module is that a large amount of electric energy is consumed and that a package size thereof is increased.

Accordingly, technologies have been developed for decreasing the size of refrigerant circulation module and adjusting the temperature of conditioned air using coolant by heat exchange between the refrigerant and the coolant. In secondary type air-conditioning systems to which these technologies apply, when indoor cooling is performed, the coolant is used instead of the refrigerant.

However, the cooling and warming performance of the secondary type air-conditioning system is determined according to how the refrigerant is regulated. There is a spatial limitation in increasing the size thereof in order to maximize the regulation of the refrigerant. Furthermore, the cooling and warming performance also varies with the regulation of the refrigerant, as well as a surrounding environment.

SUMMARY

An object of the present disclosure, which is made to solve the above-mentioned problem, is to provide an integrated thermal management system that additionally includes a heat exchanger for adjusting the temperature of refrigerant and selectively operates the heat exchanger to efficiency manage the temperature of the refrigerant, depending on situations, thereby improving cooling and warming performance.

In order to accomplish the above-mentioned object, according to an aspect of the present disclosure, there is provided an integrated thermal management system including: a refrigerant circuit within which refrigerant circulates, the refrigerant circuit configured to include a compressor, a first refrigerant heat exchanger, an expansion valve, a second refrigerant heat exchanger, an auxiliary heat exchanger, and a plurality of switch valves, the auxiliary heat exchanger managing temperature of the refrigerant with the first refrigerant heat exchanger and the second refrigerant heat exchanger through a heat exchange medium different from the refrigerant or a heat exchange medium that is controlled to temperature different from the temperature of the refrigerant, and the refrigerant circulating within the first refrigerant heat exchanger or the second refrigerant heat exchanger selectively flowing to the auxiliary heat exchanger through the plurality of switch valves; and a coolant circuit within which coolant circulates, the coolant circuit managing air conditioning or component temperature by heat exchange between the refrigerant flowing within the first refrigerant heat exchanger or the second refrigerant heat exchanger and the coolant.

In the integrated thermal management system, the auxiliary heat exchanger may be configured to adjust the temperature of the refrigerant through outside air.

In the integrated thermal management system, the coolant circuit may include: a first coolant line including a first coolant heat exchanger that exchanges heat with the first refrigerant heat exchanger of the refrigerant circuit and a first indoor heat exchanger that adjusts temperature of conditioned air by heat exchange with the coolant; and a second coolant line including a second coolant heat exchanger that exchanges heat with the second refrigerant heat exchanger of the refrigerant circuit, an outdoor heat exchanger that adjusts temperature of the coolant, and a second indoor heat exchanger that adjusts the temperature of the conditioned air.

The integrated thermal management system may further include: a third coolant line branching off from the first coolant line and including a battery; and a fourth coolant line branching off from the first coolant line and including a PE (Power Electronics), a first radiator, and a first valve.

In integrated thermal management system, the third coolant line may be connected to the first coolant line with a second valve and a third valve in between, and a fifth coolant line including a second radiator may be connected to the third coolant line.

In the integrated thermal management system, the second coolant line may be connected to the third coolant line with a third valve and a fourth valve, a fifth valve may be provided on the second coolant line, and the coolant flowing through the second coolant heat exchanger may selectively flow to the outdoor heat exchanger or the battery.

In the integrated thermal management system, the auxiliary heat exchanger may be arranged behind the outdoor heat exchanger, the first radiator, and the second radiator.

In the integrated thermal management system, the refrigerant circuit may include: a main refrigerant line including the compressor, the first refrigerant heat exchanger, the expansion valve, and the second refrigerant heat exchanger; and an auxiliary refrigerant line branching off from the main refrigerant line and including the auxiliary heat exchanger and the plurality of switch valves.

In the integrated thermal management system, the plurality of switch valves may be configured as a first switch valve and a second switch valve, and the first switch valve and the second switch valve are arranged on both sides, respectively, of the auxiliary heat exchanger on the auxiliary refrigerant line.

In the integrated thermal management system, the first switch valve may be configured with a plurality of ports that are connected to the auxiliary heat exchanger, a rear end of the first refrigerant heat exchanger, and a rear end of the second refrigerant heat exchanger, respectively, and the second switch valve may be configured with a plurality of ports that are connected to a front end of the auxiliary heat exchanger, a front end of the expansion valve, and a front end of the first refrigerant heat exchanger, respectively.

In the integrated thermal management system, in the second switch valve, the port to the auxiliary heat exchanger may be configured in a manner that makes the refrigerant expandable.

In the integrated thermal management system, in a normal mode, the first switch valve and the second switch valve may be regulated for opening or closing, in such a manner that the refrigerant circulates only along the main refrigerant line.

In the integrated thermal management system, when cooling is performed in a hybrid mode, the first switch valve may be open in such a manner that the port to the auxiliary heat exchanger and the port to the rear end of the first refrigerant heat exchanger communicate with each other, the second switch valve may be open in such a manner that the port to the auxiliary heat exchanger and the port to the front end of the first refrigerant heat exchanger communicate with each other, and in the second switch valve, the port to the auxiliary heat exchanger may fully open.

In the integrated thermal management system, when warming is performed in a hybrid mode, the first switch valve may be open in such a manner that the port to the auxiliary heat exchanger and the port to the rear end of the second refrigerant heat exchanger communicate with each other, the second switch valve may be open in such a manner that the port to the auxiliary heat exchanger and the port to the front end of the expansion valve communicate with each other, and in the second switch valve, the port to the auxiliary heat exchanger may operate to expand the refrigerant.

In the integrated thermal management system, the refrigerant circuit may include: a first refrigerant line including the compressor and the first refrigerant heat exchanger; a second refrigerant line including the expansion valve and the second refrigerant heat exchanger; and a third refrigerant line connected to the first refrigerant line and the second refrigerant line with the plurality of switch valves in between, and including the auxiliary heat exchanger.

In the integrated thermal management system, the plurality of switch valves may be configured as a third switch valve and a fourth switch valve, the third switch valve may be configured with a plurality of ports that are connected to the first refrigerant heat exchanger, the expansion valve, one side of the auxiliary heat exchanger, and the other side of the auxiliary heat exchanger, respectively, and the fourth switch valve may be configured with a plurality of ports that are connected to the front end of the compressor, the second refrigerant heat exchanger, one side of the auxiliary heat exchanger, and the other side of the auxiliary heat exchanger, respectively.

In the integrated thermal management system, in a normal mode, the third switch valve may be open in such a manner that the port to the first refrigerant heat exchanger and the port to the expansion valve communicate with each other, and the fourth switch valve may be open in such a manner that the port to the second refrigerant heat exchanger and the port to the compressor communicate with each other.

In the integrated thermal management system, when cooling is performed in a hybrid mode, the third switch valve may be open in such a manner that the port to the first refrigerant heat exchanger and the port to one side of the auxiliary heat exchanger communicate with each other and that the port to the other side of the auxiliary heat exchanger and the port to the expansion valve communicate with each other, and the fourth switch valve may be open in such a manner that the port to the second refrigerant heat exchanger and the port to the compressor communicate with each other.

In the integrated thermal management system, when cooling is performed in a hybrid mode, the third switch valve may be open in such a manner that the port to the first refrigerant heat exchanger and the port to the expansion valve communicate with each other, and the fourth switch valve may be open in such a manner that the port to the second refrigerant heat exchanger and the port to the other side of the auxiliary heat exchanger communicate with each other and that the port to one side of the auxiliary heat exchanger and the port to the compressor communicate with each other.

The integrated thermal management system structured as described above further includes the auxiliary heat exchanger for adjusting the temperature of the refrigerant, in the refrigerant circuit, in addition to the compressor, the condenser, the expansion valve, and the evaporator. The auxiliary heat exchanger selectively operates through the plurality of switch valves. Thus, the temperature of the refrigerant is efficiently managed according to situations, thereby improving cooling and warming performance.

In addition, the auxiliary heat exchanger is configured to exchange heat with outside air, thereby efficiently managing the temperature of the refrigerant and simplifying the structure of the integrated thermal management system.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Figure 1:
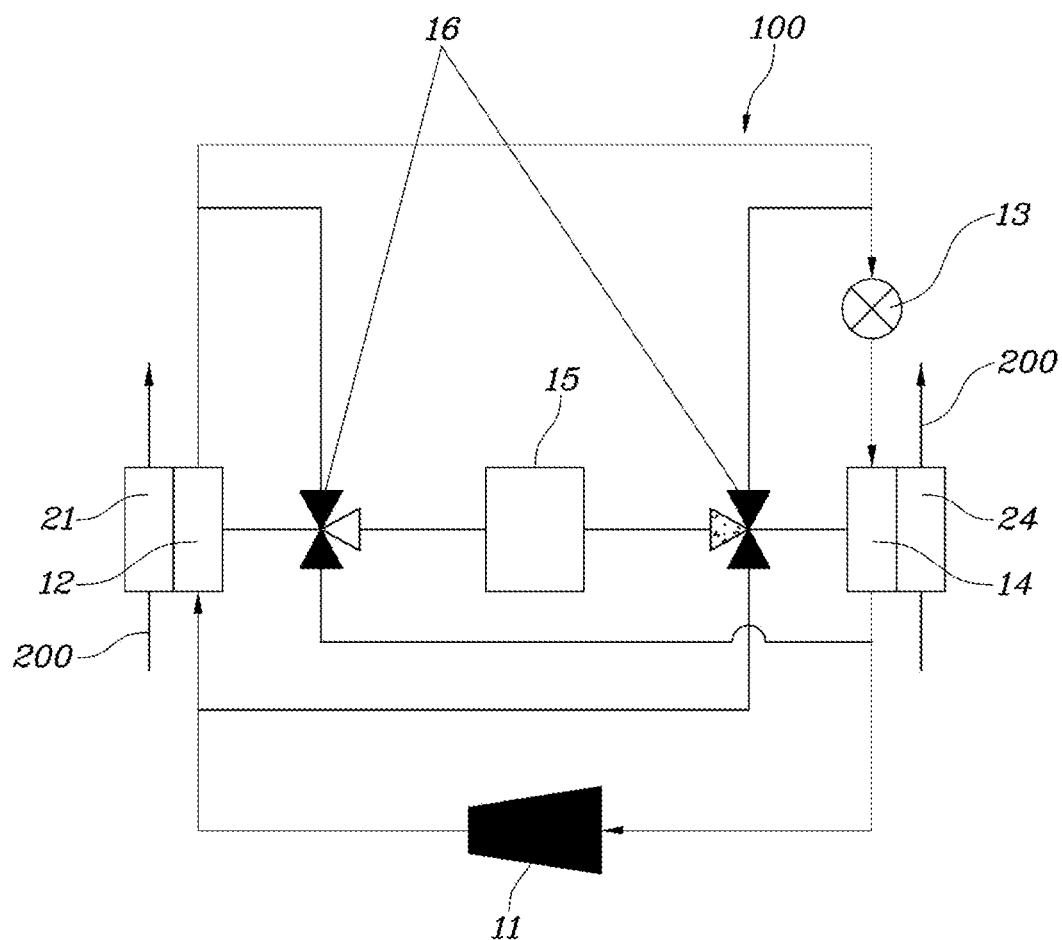
FIG. 1 is a view illustrating an example of a refrigerant circuit of an integrated thermal management system.

For the purpose of disclosure, one or more implementations of the present disclosure will be described in detail below referring to the accompanying drawings. The same or similar constituent elements are given the same reference numeral, and descriptions thereof are not repeated.

An integrated thermal management system of the present disclosure will be described below with reference to the accompanying drawings.

Figure 2:
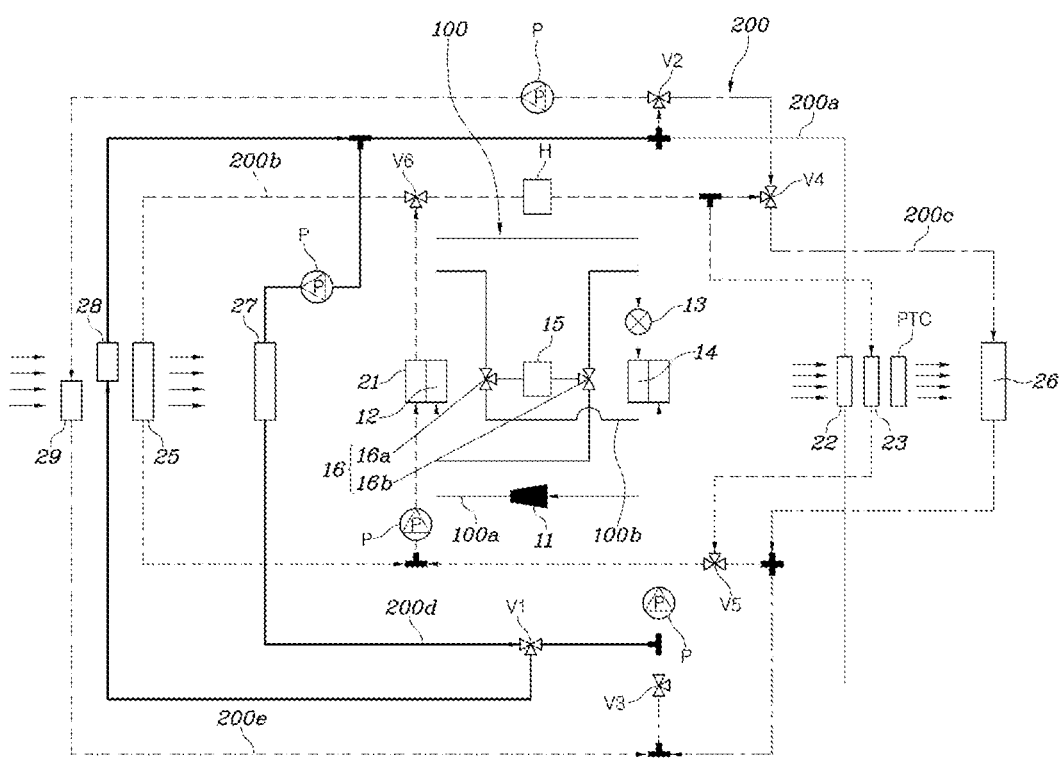
FIG. 2 is a view illustrating an example of an integrated thermal management system.

In some implementations, the integrated thermal management system, as illustrated in FIGS. 1 and 2, includes a refrigerant circuit 100 within which refrigerant circulates and a coolant circuit 200 within which coolant circulates. The refrigerant circuit 100 is configured to include a compressor 11, a first refrigerant heat exchanger 12, an expansion valve 13, a second refrigerant heat exchanger 14, an auxiliary heat exchanger 15, and a plurality of switch valves 16. The auxiliary heat exchanger 15 manages temperature of the refrigerant with the first refrigerant heat exchanger 12 and the second refrigerant heat exchanger 14 through a heat exchange medium different from the refrigerant or a heat exchange medium that is controlled to temperature different from the temperature of the refrigerant. The refrigerant circulating within the first refrigerant heat exchanger 12 or the second refrigerant heat exchanger 14 selectively flows to the auxiliary heat exchanger 15 through the plurality of switch valves 16. The coolant circuit 200 manages air conditioning or component temperature by heat exchange between the refrigerant flowing within the first refrigerant heat exchanger 12 or the second refrigerant heat exchanger 14 and the coolant.

In some implementations, the temperature of the coolant is controlled by heat exchange between the refrigerant circulating within the refrigerant circuit 100 and the coolant circulating within the coolant circuit 200. Furthermore, the cooled or heated coolant flows to an air-conditioning component, thereby forming cooling air or warming air, or flows to an electric component, thereby adjusting the temperature of the electric component.

In some implementations, the auxiliary heat exchanger 15 and the plurality of switch valves 16 are provided on the refrigerant circuit 100 within which the refrigerant circulates. That is, in the refrigerant circuit 100, the refrigerant circulates through the compressor 11, the first refrigerant heat exchanger 12, the expansion valve 13, and the second refrigerant heat exchanger 14. As a result, the first refrigerant heat exchanger 12 dissipates heat, and the second refrigerant heat exchanger 14 absorbs heat. Accordingly, the first refrigerant heat exchanger 12 may serve as a condenser, and the second refrigerant heat exchanger 14 may serve as an evaporator.

Particularly, the refrigerant circuit 100 further includes the auxiliary heat exchanger 15, and the auxiliary heat exchanger 15 is configured to adjust the temperature of the refrigerant through a heat exchange medium different from the refrigerant or a heat exchange medium that is controlled to a different temperature. In some implementations, the first refrigerant heat exchanger 12 and the second refrigerant heat exchanger 14 may each be configured to exchange heat with the coolant circulating within the coolant circuit 200, and the auxiliary heat exchanger 15 may be configured to exchange heat with outside air. That is, since the auxiliary heat exchanger 15 is configured to adjust the temperature of the refrigerant through outside air, the auxiliary heat exchanger 15 may exchange heat with outside air that is introduced from the front side of a mobile vehicle.

Particularly, with the plurality of switch valves 16, the refrigerant circulating within the refrigerant circuit 100 may selectively flow to the auxiliary heat exchanger 15. Accordingly, in a typical condition, in the refrigerant circuit 100, the refrigerant circulates through the compressor 11, the first refrigerant heat exchanger 12, the expansion valve 13, and the second refrigerant heat exchanger 14. According to the temperature of the surrounding environment or required cooling and warming performance, the refrigerant selectively flows to the auxiliary heat exchanger 15. As a result, a heat source required during cooling or warming is secured, and thus the cooling and warming performance can be improved.

Specifically, in some implementations, the coolant circuit 200 may be configured with a plurality of coolant lines.

As illustrated in FIG. 2, the coolant circuit 200 may include a first coolant line 200a and a second coolant line 200b. The first coolant line 200a includes a first coolant heat exchanger 21 that exchanges heat with the first refrigerant heat exchanger 12 of the refrigerant circuit 100, and a first indoor heat exchanger 22 that adjusts the temperature of conditioned air by heat exchange with the coolant. The second coolant line 200b includes a second coolant heat exchanger 24 that exchanges heat with the second refrigerant heat exchanger 14 of the refrigerant circuit 100, an outdoor heat exchanger 25 that adjusts the temperature of the coolant, and a second indoor heat exchanger 23 that adjusts the temperature of the conditioned air.

In addition, the coolant circuit 200 may further include a third coolant line 200c and a fourth coolant line 200d. The third coolant line 200c branches off from the first coolant line 200a and includes a battery 26. The fourth coolant line 200d branches off from the first coolant line 200a and includes a PE (Power Electronics) 27, a first radiator 28, and a first valve V1.

The third coolant line 200c may be connected to the first coolant line 200a with a second valve V2 and the third valve V3 in between. A fifth coolant line 200e that includes a second radiator 29 may be connected to the third coolant line 200c.

In addition, the second coolant line 200b may be connected to the third coolant line 200c with a fourth valve V4 and a fifth valve V5 in between. A sixth valve V6 may be provided on the second coolant line 200b. Thus, the coolant flowing through the second coolant heat exchanger 24 may selectively flow to the outdoor heat exchanger 25 or the battery 26.

A water pump P is provided on each of these coolant lines. The coolant may circulate along each of the coolant lines by driving the pump P. A water-heating heater H may be further provided on the second coolant line 200b. The temperature of the coolant may be managed through the water-heating heater H additionally supplying heat. The water-heating heater H may be provided on a front end of the second indoor heat exchanger 23 on the second coolant line 200b. When warming air is provided through the second indoor heat exchanger 23 or the temperature of the battery 26 is increased, the water-heating heater H may be selectively driven to increase the temperature of the coolant.

The first indoor heat exchanger 22 and the second indoor heat exchanger 23 are provided within an air-conditioning casing and exchange heat with the conditioned air that is provided indoors. A PTC may be further provided within the air-conditioning case in order to additionally heat during heating.

A direction in which the coolant circulating within the coolant circuit 200 flows is determined through each of the first to sixth valves V1 to V6. With adjustment of each of the first to sixth valves V1 to V6, the cold coolant, generated as a result of the first coolant heat exchanger 21 exchanging heat with the first refrigerant heat exchanger 12 in the first coolant line 200a, flows to the first indoor heat exchanger 22, thereby forming the cooling air. Furthermore, with the adjustment of each of the first to sixth valves V1 to V6, the heated coolant, generated as a result of the second coolant heat exchanger 24 exchanging heat with the second refrigerant heat exchanger 14 in the second coolant line 200b, flows to the second indoor heat exchanger 23, thereby forming the warming air.

The third coolant line 200c branches off from the first coolant line 200a. The direction in which the coolant flows is changed depending on whether the fourth valve V4 and the fifth valve V5 are open or closed. Thus, the coolant flowing along the second coolant line 200b or the fifth coolant line 200e may be shared, and the temperature of the battery 26 and the temperature of the coolant may be managed.

In addition, the fourth coolant line 200d branches off from the first coolant line 200a. The direction in which the coolant flows is changed depending on whether the first valve V1 is open or closed. Thus, the temperature of the PE 27 and the temperature of the coolant may be managed.

Accordingly, the coolant that circulates along each of the plurality of the coolant lines is shared or separately circulates by regulating each of the plurality of the valves provided on the refrigerant circuit 100 for opening or closing. Thus, it is possible to generate the conditioned air for indoor cooling and warming and to manage the temperature of the battery 26 and the temperature of the PE 27. Furthermore, it is also possible to implement a heat pump.

In some implementations, the auxiliary heat exchanger 15 and the plurality of switch valves 16 are provided in order to increase the efficiency in managing the temperature of the refrigerant and the temperature of the coolant through the use of the first refrigerant heat exchanger 12 and the second refrigerant heat exchanger 14.

Figure 3:
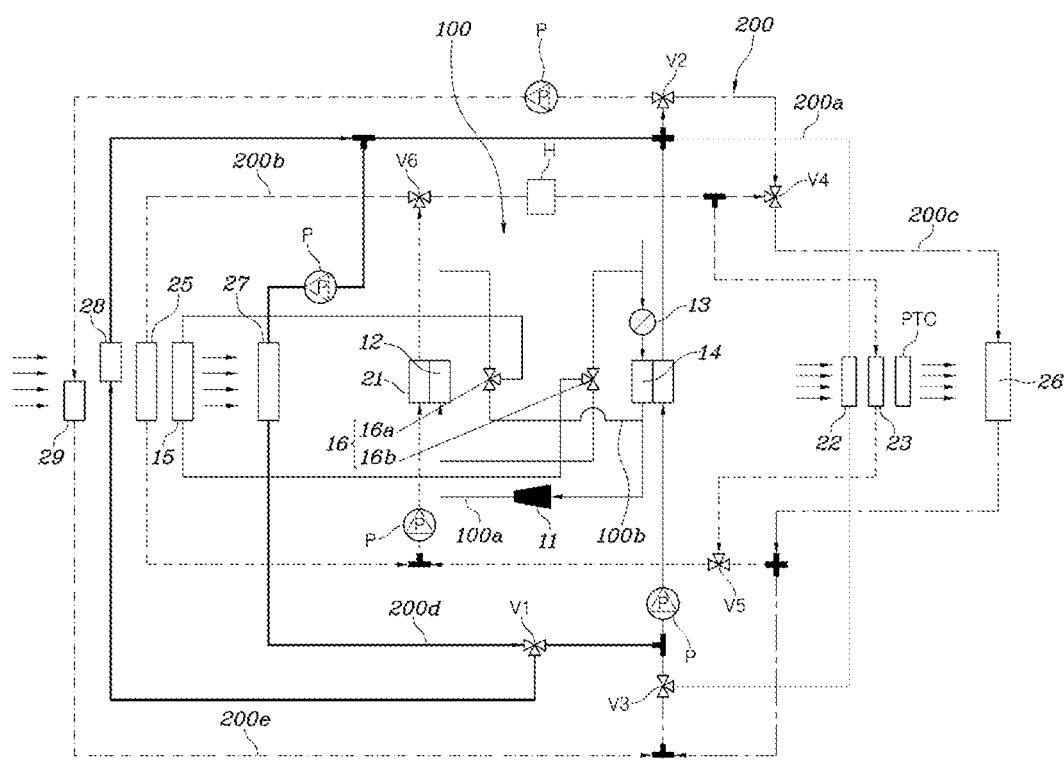
FIG. 3 is a view illustrating an example of an auxiliary heat exchanger in the integrated thermal management system in FIG. 2.

As illustrated in FIG. 3, the auxiliary heat exchanger 15 is configured to exchange heat with outside air. Thus, the auxiliary heat exchanger 15 may exchange heat with the outside air that is introduced from the front side of the mobile vehicle. Particularly, the auxiliary heat exchanger 15 may be arranged behind the outdoor heat exchanger 25, the first radiator 28, and the second radiator 29 that are provided on the coolant circuit 200.

In this manner, the auxiliary heat exchanger 15, along with the outdoor heat exchanger 25, the first radiator 28, and the second radiator 29, is provided inside the mobile vehicle. Thus, because a separate installation space is not required, the size of an entire package may be reduced. In addition, the refrigerant that greatly changes in temperature circulates within the auxiliary heat exchanger 15. Because of this, the auxiliary heat exchanger 15 is arranged behind the outdoor heat exchanger 25, the first radiator 28, and the second radiator 29. Thus, the auxiliary heat exchanger 15 is less influenced by the change in the temperature of the coolant, and the temperature of the coolant is efficiently managed.

With the presence of the auxiliary heat exchanger 15 and the plurality of switch valves 16, the refrigerant circuit 100 may be provided as various implementation examples.

In some implementations, as illustrated in FIG. 1, the refrigerant circuit 100 includes a main refrigerant line 100a and an auxiliary refrigerant line 100b. The main refrigerant line 100a includes the compressor 11, the first refrigerant heat exchanger 12, the expansion valve 13, and the second refrigerant heat exchanger 14. The auxiliary refrigerant line 100b branches off from the main refrigerant line 100a and includes the auxiliary heat exchanger 15 and the plurality of switch valves 16.

In this manner, the refrigerant circuit 100 is configured with the main refrigerant line 100a and the auxiliary refrigerant line 100b.

The compressor 11, the first refrigerant heat exchanger 12, the expansion valve 13, and the second refrigerant heat exchanger 14 are sequentially arranged on the main refrigerant line 100a. Thus, through the circulation of the refrigerant, the first refrigerant heat exchanger 12 serves as a condenser to dissipate heat, and the second refrigerant heat exchanger 14 serves as an evaporator to absorb heat.

Particularly, the auxiliary refrigerant line 100b branches off from the main refrigerant line 100a, and the auxiliary heat exchanger 15 and the plurality of switch valves 16 are provided on the auxiliary refrigerant line 100b. Thus, the refrigerant that circulates along the main refrigerant line 100a circulates within the auxiliary heat exchanger 15, depending on whether the switch valve 16 is open or closed.

In some implementations, the plurality of switch valves 16 may be configured as a first switch valve 16a and a second switch valve 16b. The first switch valve 16a and the second switch valve 16b may be arranged on both sides, respectively, of the auxiliary heat exchanger 15 on the auxiliary refrigerant line 100b.

The first switch valve 16a may be configured with a plurality of ports to the auxiliary heat exchanger 15, the rear end of the first refrigerant heat exchanger 12, and the rear end of the second refrigerant heat exchanger 14, respectively. The second switch valve 16*b* may be configured with a plurality of ports the auxiliary heat exchanger 15, the front end of the expansion valve 13, and the front end of the first refrigerant heat exchanger 12, respectively.

That is, the first switch valve 16*a* is arranged to one side of the auxiliary heat exchanger 15, and the second switch valve 16*b* is arranged to the other side of the auxiliary heat exchanger 15. The refrigerant circulating along the main refrigerant line 100*a* flows to the auxiliary refrigerant line 100*b* thereby flowing through the auxiliary heat exchanger 15, depending on whether the switch valve 16 is open or closed.

The first switch valve 16*a* may be configured as a three-way valve configured with the port for connection to the auxiliary heat exchanger 15, the port for connection to the rear end of the first refrigerant heat exchanger 12, and the port for connection to the rear end of the second refrigerant heat exchanger 14.

In addition, the second switch valve 16*b* may be configured as a three-way valve configured with the port for connection to the auxiliary heat exchanger 15, the port for connection to the front end of the expansion valve 13, and the port for connection to the first refrigerant heat exchanger 12.

Particularly, in the second switch valve 16*b*, the port to the auxiliary heat exchanger 15 may be configured in a manner that makes the refrigerant expandable. In the second switch valve 16*b*, the port for the connection to the auxiliary heat exchanger 15 may be configured to have a separate expander or may be configured in such a manner to make the refrigerant expandable. Technologies that realize a multi-port structure in which a function of expanding the refrigerant can be performed are widely known in various ways, and thus detailed descriptions thereof are omitted.

Through the use of the first switch valve 16*a* and the second switch valve 16*b*, the refrigerant that circulates along the main refrigerant line 100*a* exchanges heat with the coolant flowing within the coolant circuit 200, in the first refrigerant heat exchanger 12 and the second refrigerant heat exchanger 14, resulting in the temperature thereof being adjusted. Alternatively, the first switch valve 16*a* and the second switch valve 16*b* are regulated for opening or closing, depending on a surrounding environment or various situations that include air-conditioning temperature for cooling and warming. Thus, the refrigerant selectively circulates within the auxiliary heat exchanger 15, thereby possibly improving the efficiency in utilizing the refrigerant.

In some implementations, the first switch valve 16*a* and the second switch valve 16*b* may be regulated for opening or closing, in a normal mode or a hybrid mode, in a situation where, in the refrigerant circuit 100, the refrigerant needs to flow to the auxiliary heat exchanger 15. The degree is determined by a controller's control. Depending on various situations, the controller may issue a valve opening or closing command to each of the valves.

In the normal mode, the first switch valve 16*a* and the second switch valve 16*b* may be regulated for opening or closing, in such a manner that the refrigerant flows only along the main refrigerant line 100*a*.

Figure 4:
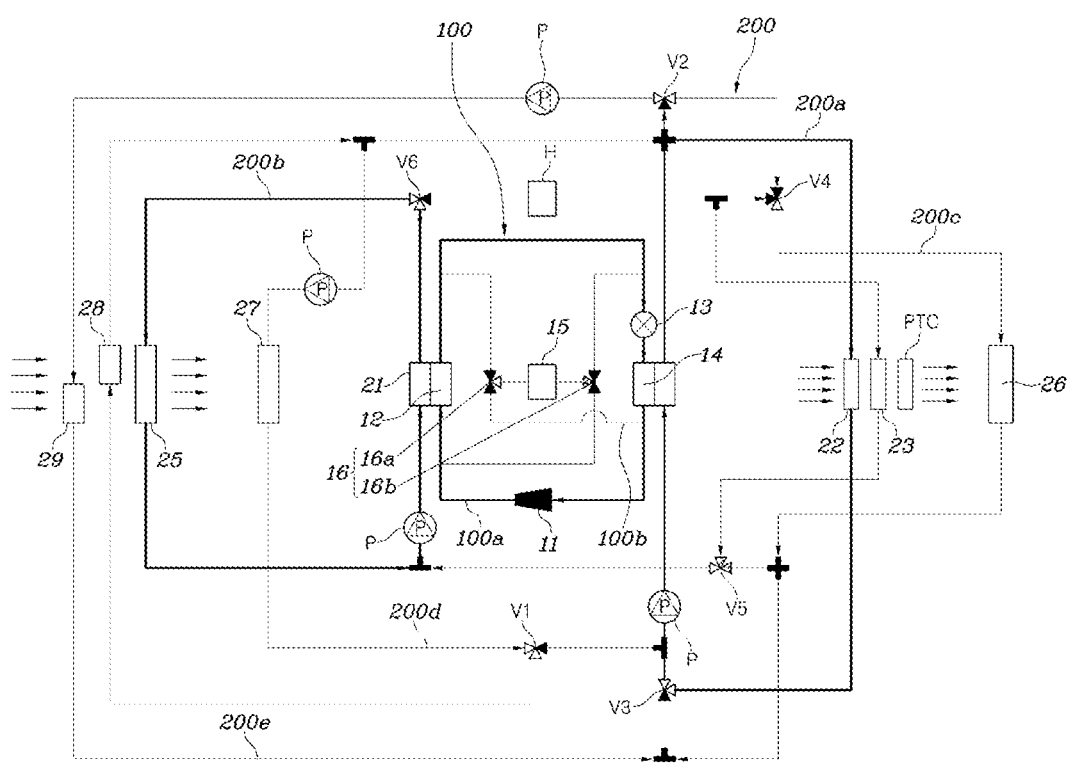
FIG. 4 is a view illustrating an example state where the integrated thermal management system in FIG. 2 performs cooling in a normal mode.

As illustrated in FIG. 4, in a case where cooling is performed in the normal mode, the first switch valve 16*a* and the second switch valve 16*b* may be regulated for opening or closing, in such a manner that the refrigerant circulates only along the main refrigerant line 100*a* in the refrigerant circuit 100. Accordingly, in the refrigerant circuit 100, the refrigerant circulates through the compressor 11, the first refrigerant heat exchanger 12, the expansion valve 13, and the second refrigerant heat exchanger 14. Furthermore, the first refrigerant heat exchanger 12 exchanges heat with the coolant flowing within the first coolant heat exchanger 21, thereby y condensing the refrigerant. Similarly, the second refrigerant heat exchanger 14 exchanges heat with the coolant flowing within the second coolant heat exchanger 24, thereby absorbing heat. In some examples, the expansion valve 13 operates to expand the refrigerant. The cold coolant that is cooled through the second refrigerant heat exchanger 14 in the coolant circuit 200 may flow to the first indoor heat exchanger 22, thereby generating cool air.

When cooling is performed in the hybrid mode, the first switch valve 16*a* may be open in such a manner that the port to the auxiliary heat exchanger 15 and the port to the rear end of the first refrigerant heat exchanger 12 communicate with each other. Furthermore, the second switch valve 16*b* may be open in such a manner that the port to the auxiliary heat exchanger 15 and the port to the rear end of the first refrigerant heat exchanger 12 are open. Furthermore, in the second switch valve 16*b*, the port to the auxiliary heat exchanger 15 may be fully open.

Figure 5:
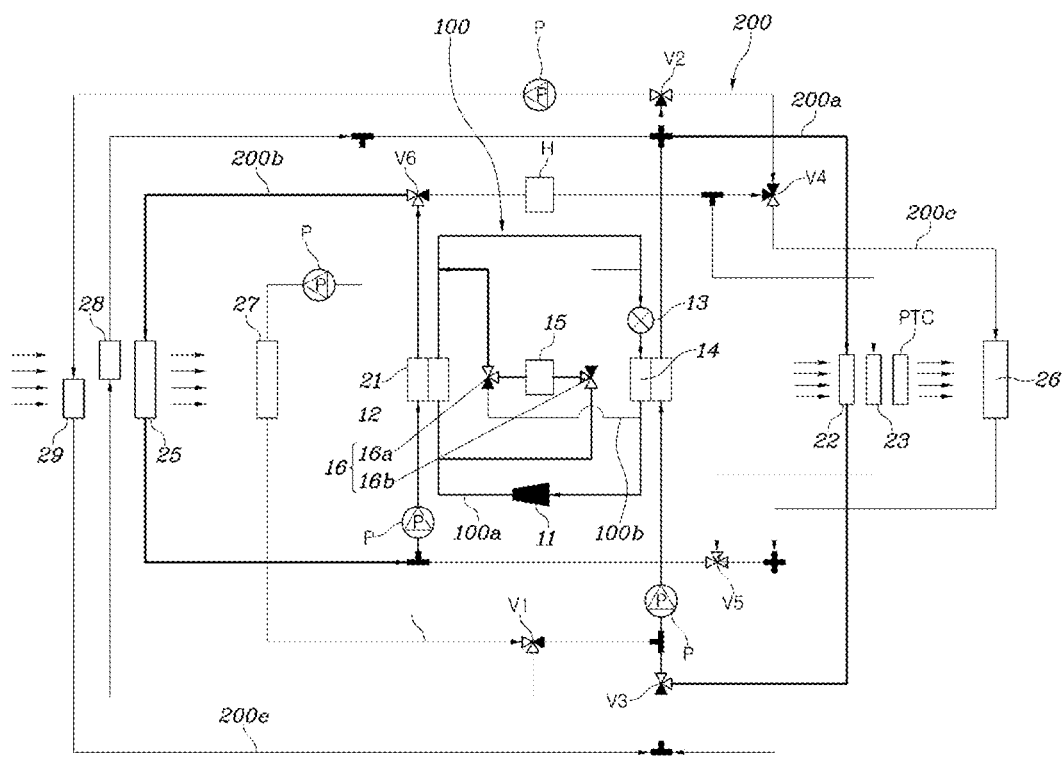
FIG. 5 is a view illustrating an example state where the integrated thermal management system in FIG. 2 performs cooling in a hybrid mode.

As illustrated in FIG. 5, when cooling is in the hybrid mode, the first switch valve 16*a* and the second switch valve 16*b* may be regulated for opening or closing, in such a manner that, in the refrigerant circuit 100, the refrigerant circulates along the main refrigerant line 100*a* and the auxiliary refrigerant line 100*b*.

Particularly, the first switch valve 16*a* is open in such a manner that the port to the auxiliary heat exchanger 15 and the port to the rear port of the first refrigerant heat exchanger 12 communicate with each other. Furthermore, the second switch valve 16*b* is open in such a manner that the port to the auxiliary heat exchanger 15 and the port to the front end of the first refrigerant heat exchanger 12 communicate with each other. Thus, the refrigerant flowing through the compressor 11 flows to the first refrigerant heat exchanger 12 and the auxiliary heat exchanger 15 and then circulates within the expansion valve 13 and the second refrigerant heat exchanger 14. In some examples, in the second switch valve 16*b*, the port to the auxiliary heat exchanger 15 is fully open and thus may not expand the refrigerant.

Accordingly, the refrigerant flowing through the compressor 11 exchanges heat with the coolant flowing within the first coolant heat exchanger 21, in the first refrigerant heat exchanger 12, and exchanges heat with outside air through the auxiliary heat exchanger 15. Thus, the efficiency in condensing the refrigerant is improved, and when the refrigerant is expanded through the expansion valve 13, the evaporation performance of the second refrigerant heat exchanger 14 is increased. Accordingly, the coolant circulating within the second coolant heat exchanger 24 has the improved cooling performance when exchanging heat with the refrigerant through the second refrigerant heat exchanger 14. Thus, the indoor cooling performance can be improved through the first indoor heat exchanger 22.

When warming is performed in the hybrid mode, the first switch valve 16*a* is open in such a manner that the port to the auxiliary heat exchanger 15 and the port to the rear end of the second refrigerant heat exchanger 14 communicate with each other. Furthermore, the second switch valve 16*b* is open in such a manner that the port to the auxiliary heat exchanger 15 and the port to the front end of the expansion valve 13 communicate with each other. Furthermore, in the second switch valve 16*b*, the port to the auxiliary heat exchanger 15 may operate to expand the refrigerant.

Figure 6:
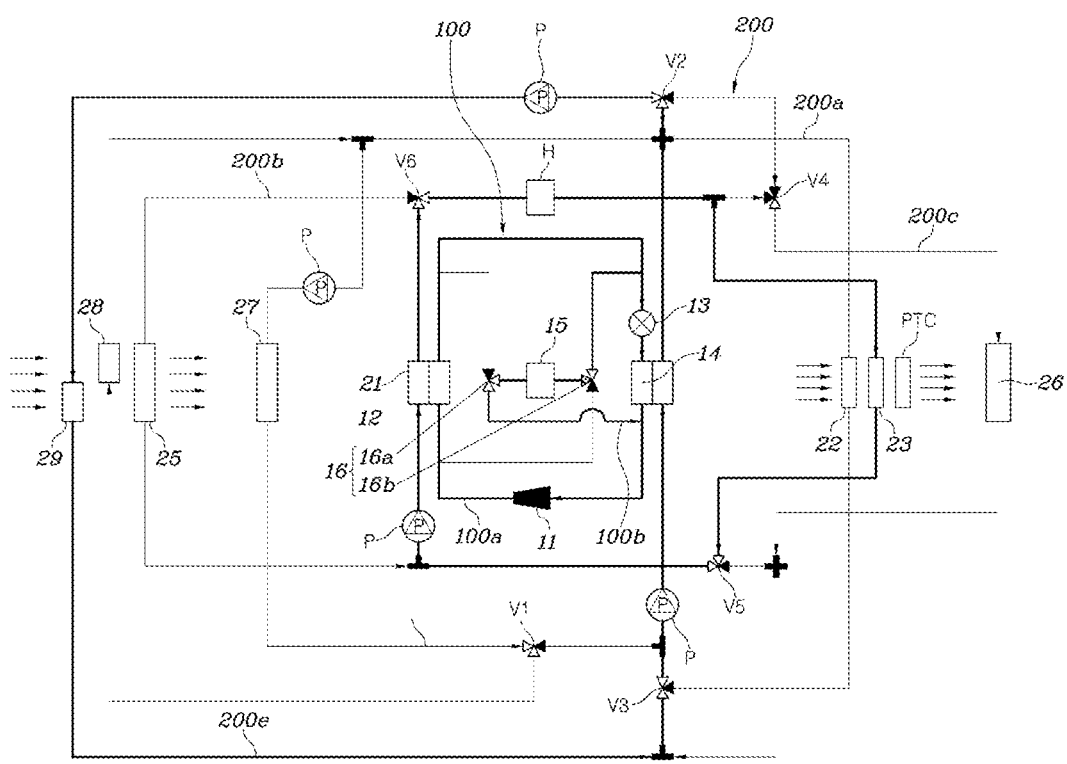
FIG. 6 is a view illustrating an example state where the integrated thermal management system in FIG. 2 performs cooling in a hybrid mode.

As illustrated in FIG. 6, when warming is performed in the hybrid mode, the first switch valve 16*a* and the second switch valve 16b may be regulated in such a manner that, in the refrigerant circuit 100, the refrigerant circulates along the main refrigerant line 100a and the auxiliary refrigerant line 100b.

Particularly, the first switch valve 16a is open in such a manner that the port to the auxiliary heat exchanger 15 and the port to the rear end of the second refrigerant heat exchanger 14 communicate with each other. Furthermore, the second switch valve 16b is open in such a manner that the port to the auxiliary heat exchanger 15 and the port to the rear end of the expansion valve 13 communicate with each other. Thus, the refrigerant flowing through the compressor 11 and the first refrigerant heat exchanger 12 circulates within the expansion valve 13 and the second switch valve 16b. In some examples, the expansion valve 13 operates to expand the refrigerant, and, in the second switch valve 16b, the port to the auxiliary heat exchanger 15 also operates to expand the refrigerant. Thus, an amount of absorbed heat is secured through the auxiliary heat exchanger 15, as well as through the second refrigerant heat exchanger 14. Accordingly, the heat dissipation performance of the refrigerant is increased through the first refrigerant heat exchanger 12 after the refrigerant is compressed through the compressor 11. Thus, the indoor warming performance can be improved through the second indoor heat exchanger 23.

In some implementations, the refrigerant circuit 100 changes the direction in which the refrigerant flows, by regulating the first switch valve 16a and the second switch valve 16b for opening or closing, and thus may secure the cooling and warming performance. In addition, the temperature of the battery 26 may be adjusted by causing the coolant to circulate to the battery 26 through the regulation of each of the valves for opening or closing. Alternatively, the temperature of the PE 27 may be adjusted by causing the coolant to circulate to the PE 27. Alternatively, the temperature of the coolant may be managed by causing the coolant to circulate through the outdoor heat exchanger 25, the first radiator 28, and the second radiator 29.

Figure 7:
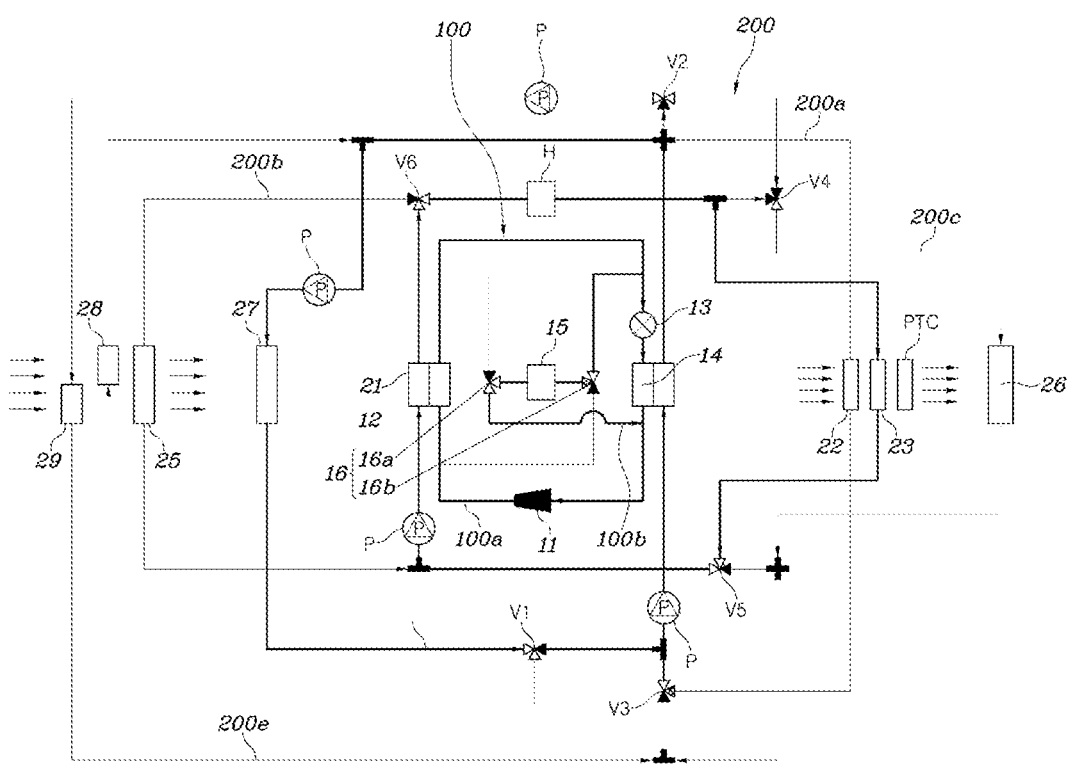
FIG. 7 is a view illustrating an example of a heat pump that operates while the integrated thermal management system in FIG. 2 performs cooling in the hybrid mode.

As an implementation example, as illustrated in FIG. 7, when the heat pump operates while warming is performed in the hybrid mode, the refrigerant flowing within the refrigerant circuit 100 performs warming in the same manner as described above, and, in the coolant circuit 200, the coolant circulates along the first coolant line 200a and the fourth coolant line 200d. Thus, the refrigerant may exchange heat with the PE 27.

In some implementations, the refrigerant circuit 100 includes a first refrigerant line 100c, a second refrigerant line 100d, and a third refrigerant line 100e. The first refrigerant line 100c includes the compressor 11 and the first refrigerant heat exchanger 12. The second refrigerant line 100d includes the expansion valve 13 and the second refrigerant heat exchanger 14. The third refrigerant line 100e is connected to the first refrigerant line 100c and the second refrigerant line 100d with the plurality of switch valves 16 in between and includes the auxiliary heat exchanger 15.

Figure 8:
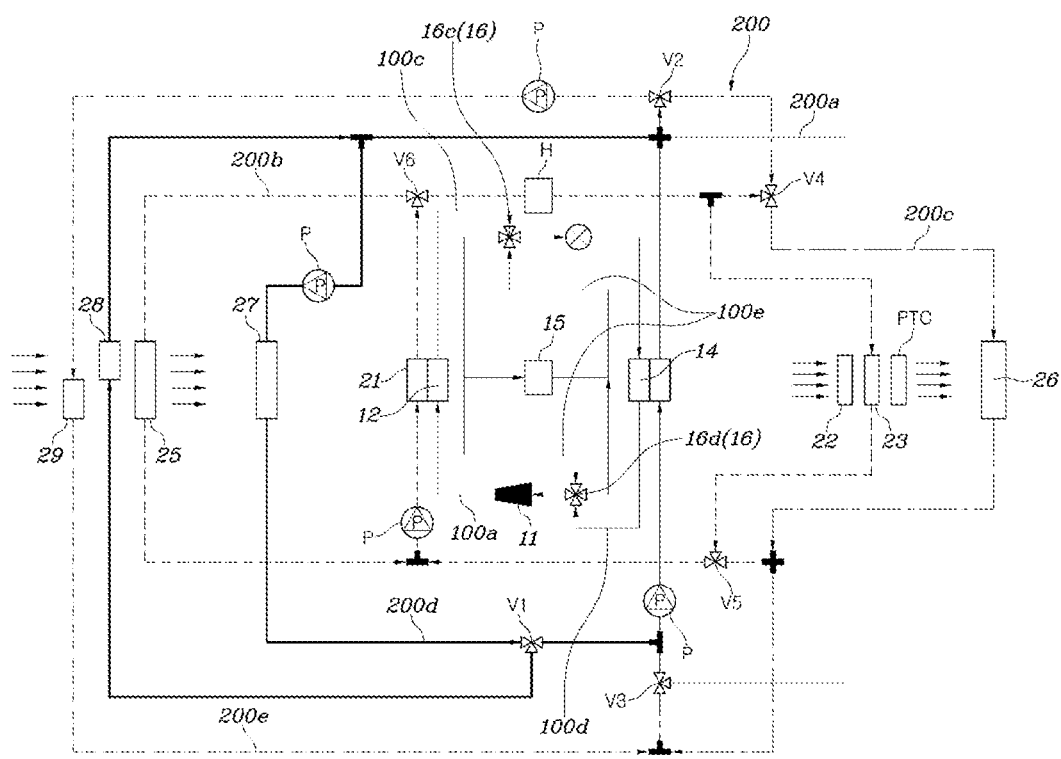
FIG. 8 is a view illustrating an example of an integrated thermal management system.

As illustrated in FIG. 8, the refrigerant circuit 100 is configured with the first refrigerant line 100c, the second refrigerant line 100d, and the third refrigerant line 100e.

The first refrigerant line 100c, the second refrigerant line 100d, and the third refrigerant line 100e are connected to each other with a plurality of switch valves in between. The compressor 11 and the first refrigerant heat exchanger 12 are provided on the first refrigerant line 100c. The expansion valve 13 and the second refrigerant heat exchanger 14 are provided on the second refrigerant line 100d. The refrigerant, when circulating along the first refrigerant line 100c and the second refrigerant line 100d, sequentially flows to the compressor 11, the first refrigerant heat exchanger 12, the expansion valve 13, and the second refrigerant heat exchanger 14. Thus, due to this circulation of the refrigerant, the first refrigerant heat exchanger 12, as a condenser, may dissipate heat, and the second refrigerant heat exchanger 14, as an evaporator, may absorb heat.

The third refrigerant line 100e is connected to the first refrigerant line 100c and the second refrigerant line 100d with a plurality of switch valves in between. The auxiliary heat exchanger 15 is provided on the third refrigerant line 100e. Thus, the refrigerant circulating along the first refrigerant line 100c and the second refrigerant line 100d may also circulate within the auxiliary heat exchanger 15, depending on whether the switch valve 16 is open or closed.

Figure 9:
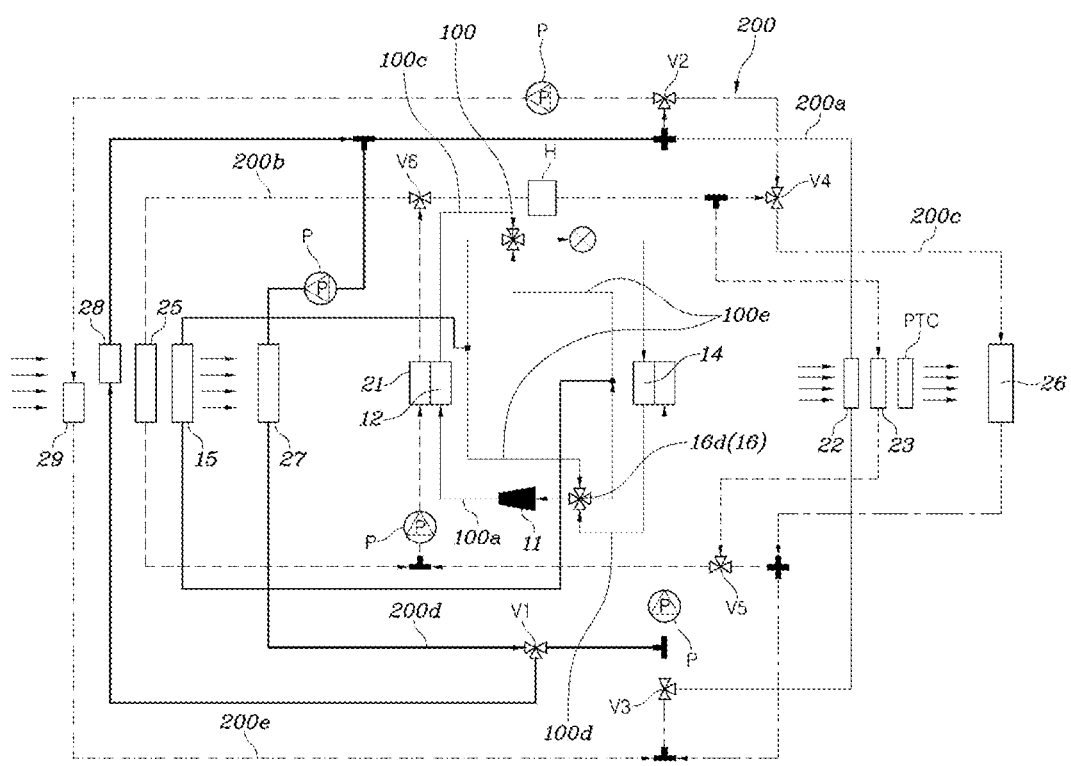
FIG. 9 is a view illustrating an example of an auxiliary heat exchanger in the integrated thermal management system in FIG. 8.

In some examples, as illustrated in FIG. 9, the auxiliary heat exchanger 15 may be arranged behind the outdoor heat exchanger 25, the first radiator 28, and the second radiator 29 that are provided on the coolant circuit 200.

In some implementations, the plurality of switch valves 16 may be configured as a third switch valve 16c and the fourth switch valve 16d. Furthermore, the third switch valve 16c may be configured with a plurality of ports to the first refrigerant heat exchanger 12, the expansion valve 13, one side of the auxiliary heat exchanger 15, and the other side of the auxiliary heat exchanger 15, respectively. Furthermore, the fourth switch valve 16d may be configured with a plurality of ports to the front end of the compressor 11, the second refrigerant heat exchanger 14, one side of the auxiliary heat exchanger 15, and the other side of the auxiliary heat exchanger 15, respectively.

Accordingly, the third refrigerant line 100e may be configured with a line that is connected from the auxiliary heat exchanger 15 to the third switch valve 16c and the fourth switch valve 16d, and a line that is connected from the other side of the auxiliary heat exchanger 15 to the third switch valve 16c and the fourth switch valve 16d.

In some examples, the third switch valve 16c may be arranged between the first refrigerant heat exchanger 12 and the expansion valve 13. The third switch valve 16c may be configured as a four-way valve that is configured with a port for connection to the first refrigerant heat exchanger 12, a port for connection to the expansion valve 13, a port for connection to one side of the auxiliary heat exchanger 15, and a port for connection to the other side of the auxiliary heat exchanger 15.

In addition, the fourth switch valve 16d may be arranged between the second refrigerant heat exchanger 14 and the compressor 11. The fourth switch valve 16d may be configured as a four-way valve that is configured with a port for connection to the compressor 11, a port for connection to the second refrigerant heat exchanger 14, a port for connection to one side of the auxiliary heat exchanger 15, and a port for connection to the other side of the auxiliary heat exchanger 15.

With the third switch valve 16c and the fourth switch valve 16d, the refrigerant circulating within the refrigerant circuit 100 exchanges heat with the coolant flowing within the coolant circuit 200 through the first refrigerant heat exchanger 12 on the first refrigerant line 100c and through the second refrigerant heat exchanger 14 on the second refrigerant line 100d, resulting in the temperature thereof being adjusted. Alternatively, the third switch valve 16c and the fourth switch valve 16d are regulated for opening or closing, depending on a surrounding environment or various situations that include air-conditioning temperature for cooling and warming. Thus, the refrigerant may also circulate within the auxiliary heat exchanger 15, thereby possibly improving the efficiency in utilizing the refrigerant.

In some implementations, the third switch valve 16c and the fourth switch valve 16d may be regulated for opening or closing, in the normal mode or in the hybrid mode, in the situation where, in the refrigerant circuit 100, the refrigerant needs to flow to the auxiliary heat exchanger 15.

When the normal mode is entered, the third switch valve 16c may be open in such a manner that the port to the first refrigerant heat exchanger 12 and the port to the expansion valve 13 communicate with each other, and the fourth switch valve 16d may be open in such a manner that the port to the second refrigerant heat exchanger 14 and the port to the compressor 11 communicate with each other.

Figure 10:
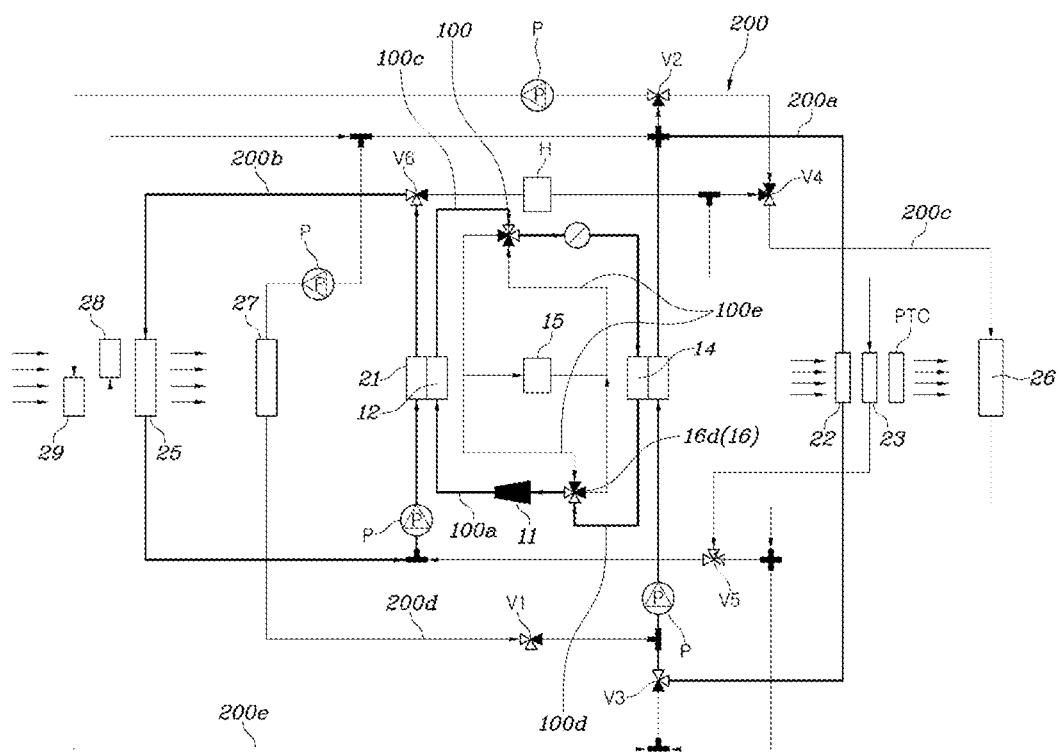
FIG. 10 is a view illustrating an example state where the integrated thermal management system in FIG. 8 performs cooling in the normal mode.

As illustrated in FIG. 10, when cooling is performed in the normal mode, the third switch valve 16c and the fourth switch valve 16d may be regulated in such a manner that the refrigerant circulates only along the first refrigerant line 100c and the second refrigerant line 100d. Accordingly, in the refrigerant circuit 100, the refrigerant circulates through the compressor 11, the first refrigerant heat exchanger 12, the expansion valve 13, and the second refrigerant heat exchanger 14. Furthermore, the first refrigerant heat exchanger 12 exchanges heat with the coolant flowing within the first coolant heat exchanger 21, thereby condensing the refrigerant. Similarly, the second refrigerant heat exchanger 14 exchanges heat with the coolant flowing within the second coolant heat exchanger 24, thereby absorbing heat. In some examples, the expansion valve 13 operates to expand the refrigerant. The cold coolant that is cooled through the second refrigerant heat exchanger 14 in the coolant circuit 200 may flow to the first indoor heat exchanger 22, thereby generating cool air.

When cooling is performed in the hybrid mode, the third switch valve 16c may be open in such a manner that the port to the first refrigerant heat exchanger 12 and the port to one side of the auxiliary heat exchanger 15 communicate with each other, and may be open in such a manner that the port to the other side of the auxiliary heat exchanger 15 and the port to the expansion valve 13 communicate with each other. Furthermore, the fourth switch valve 16d may be open in such a manner that the port to the second refrigerant heat exchanger 14 and the port to the compressor 11 communicate with each other.

Figure 11:
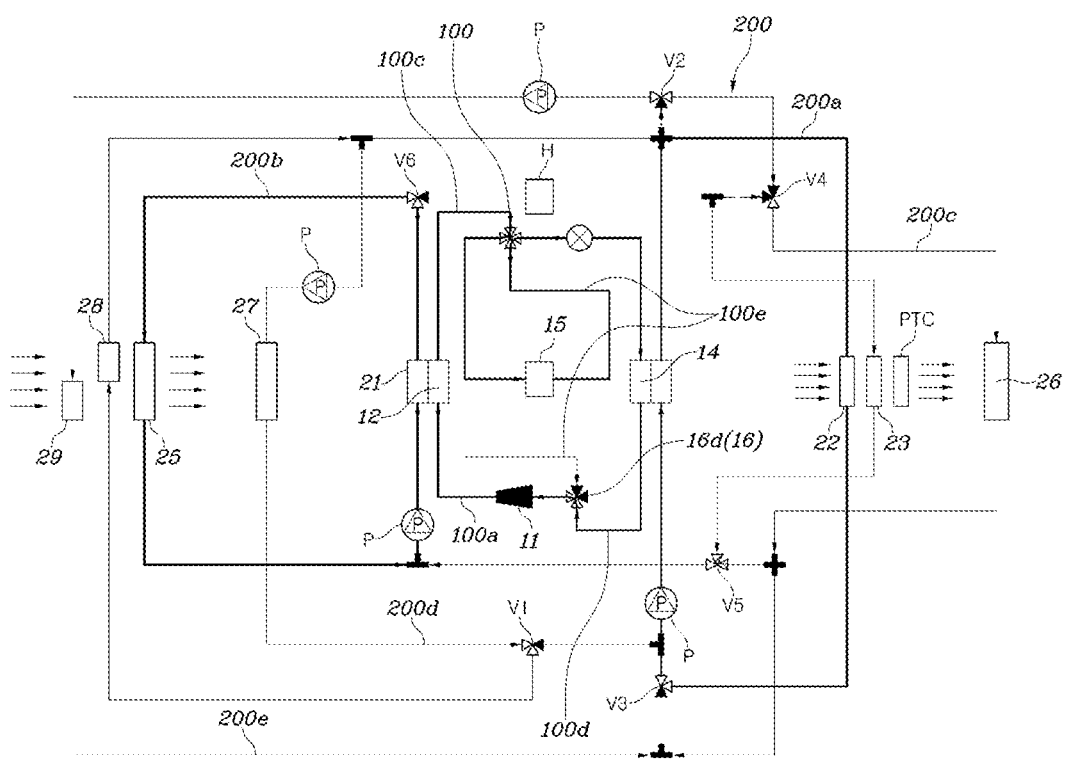
FIG. 11 is a view illustrating an example state where the integrated thermal management system in FIG. 8 performs cooling in the normal mode.

As illustrated in FIG. 11, when cooling is performed in the hybrid mode, the third switch valve 16c and the fourth switch valve 16d may be regulated in such a manner that, in the refrigerant circuit 100, the refrigerant circulates along all the first refrigerant line 100c, the second refrigerant line 100d, and the third refrigerant line 100e.

In some examples, the third switch valve 16c is open in such a manner that the port to the first refrigerant heat exchanger 12 and the port to one side of the auxiliary heat exchanger 15 communicate with each other. Furthermore, the fourth switch valve 16d is open in such a manner that the port to the other side of the auxiliary heat exchanger 15 and the port to the expansion valve 13 communicate with each other. Thus, the refrigerant flowing through the compressor 11 and the first refrigerant heat exchanger 12 flows to the auxiliary heat exchanger 15, and the refrigerant flowing through the auxiliary heat exchanger 15 is expanded through the expansion valve 13 and circulates within the second refrigerant heat exchanger 14.

In this manner, the refrigerant flowing through the compressor 11 is primarily condensed in the first refrigerant heat exchanger 12 and secondarily condensed in the auxiliary heat exchanger 15, thereby increasing an amount of condensed refrigerant. Thus, when the refrigerant is expanded through the expansion valve 13, the evaporation performance of the second refrigerant heat exchanger 14 can be increased. Accordingly, the coolant circulating within the second coolant heat exchanger 24 has the improved cooling performance when exchanging heat with the refrigerant through the second refrigerant heat exchanger 14. Thus, the indoor cooling performance can be improved through the first indoor heat exchanger 22.

The fourth switch valve 16d is open in such a manner that the port to the second refrigerant heat exchanger 14 and the port to the compressor 11 communicate with each other. Thus, the refrigerant flowing through the second refrigerant heat exchanger 14 recirculates within the refrigerant.

When cooling is performed in the hybrid mode, the third switch valve 16c is open in such a manner that the port to the first refrigerant heat exchanger 12 and the port to the expansion valve 13 communicate with each other. Furthermore, the fourth switch valve 16d is open in such a manner that the port to the second refrigerant heat exchanger 14 and the port to the other side of the auxiliary heat exchanger 15 communicate with each other and that the port to one side of the auxiliary heat exchanger 15 and the port to the compressor 11 communicate with each other.

Figure 12:
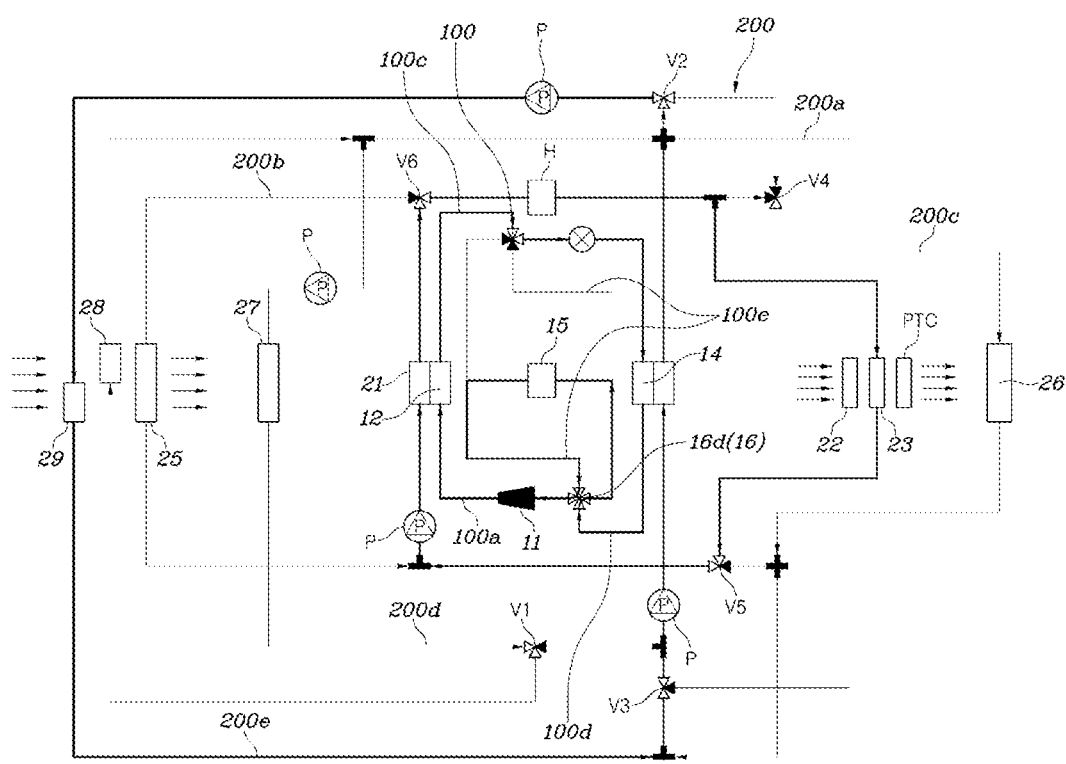
FIG. 12 is a view illustrating an example state where the integrated thermal management system in FIG. 8 performs cooling in the hybrid mode.

As illustrated in FIG. 12, when warming is performed in the hybrid mode, the third switch valve 16c and the fourth switch valve 16d may be regulated in such a manner that, in the refrigerant circuit 100, the refrigerant circulates along all the first refrigerant line 100c, the second refrigerant line 100d, and the third refrigerant line 100e.

In some implementations, the third switch valve 16c is open in such a manner that the port to the first refrigerant heat exchanger 12 and the port to the expansion valve 13 communicate with each other. Thus, the refrigerant flowing through the compressor 11 sequentially flows to the first refrigerant heat exchanger 12 and the expansion valve 13, thereby being expanded. Particularly, the refrigerant expanded while flowing through the expansion valve 13 absorbs heat while primarily evaporating through the second refrigerant heat exchanger 14, and absorbs heat while secondarily evaporating through the auxiliary heat exchanger 15. Thus, amount of absorbed heat is increased. Accordingly, when the refrigerant is compressed through the compressor 11, the temperature of the refrigerant may be increased, and the heat dissipation performance of the refrigerant is increased through the first refrigerant heat exchanger 12. Thus, the indoor warming performance can be improved through the second indoor heat exchanger 23.

In some implementations, the refrigerant circuit 100 changes the direction in which the refrigerant flows, by regulating the third switch valve 16c and the fourth switch valve 16d for opening or closing, and thus may secure the cooling and warming performance. In addition, the temperature of the battery 26 may be adjusted by causing the coolant to circulate to the battery 26 through the regulation of each of the valves for opening or closing. Alternatively, the temperature of the PE 27 may be adjusted by causing the coolant to circulate to the PE 27. Alternatively, the temperature of the coolant may be managed by causing the coolant to circulate through the outdoor heat exchanger 25, the first radiator 28, and the second radiator 29.

Figure 13:
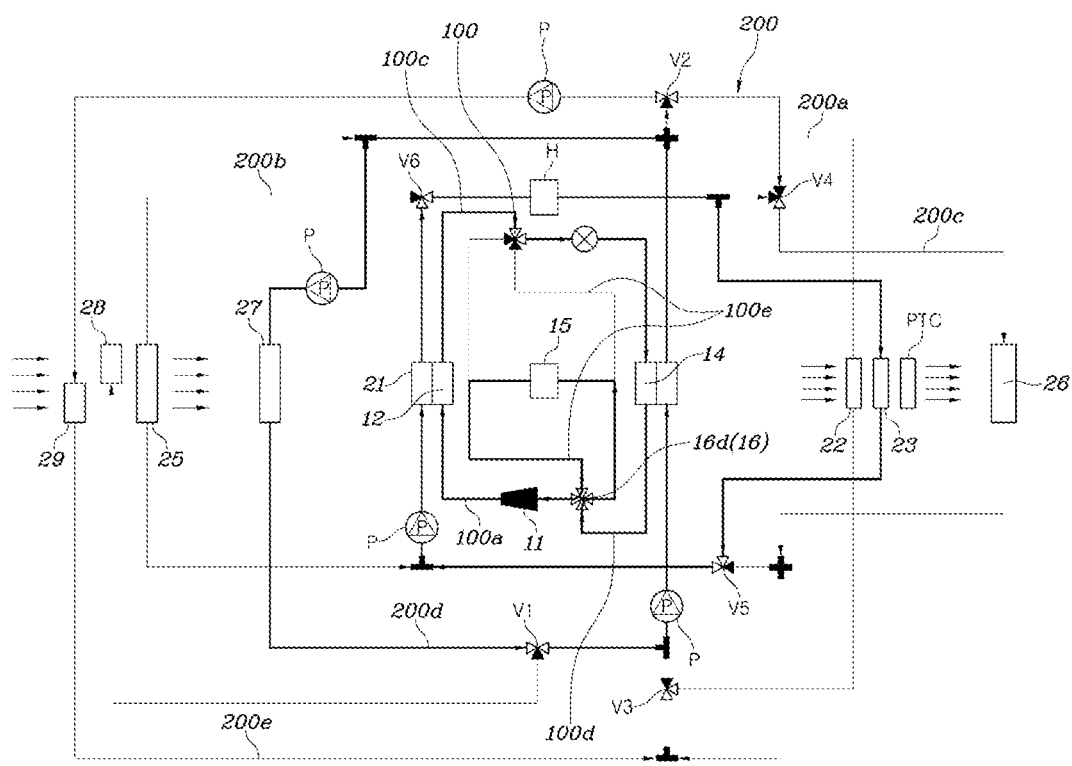
FIG. 13 is a view illustrating an example of a heat pump that operates while the integrated thermal management system in FIG. 8 performs cooling in the hybrid mode.

As an implementation example, as illustrated in FIG. 13, when the heat pump operates while warming is performed in the hybrid mode, the refrigerant flowing within the refrigerant circuit 100 performs warming in the same manner as described above, and, in the coolant circuit 200, the coolant circulates along the first coolant line 200a and the fourth coolant line 200d. Thus, the refrigerant may exchange heat with the PE 27.

The integrated thermal management system structured as described above further includes the auxiliary heat exchanger 15 for adjusting the temperature of the refrigerant, in the refrigerant circuit 100, in addition to the compressor 11, the condenser, the expansion valve 13, and the evaporator. The integrated thermal management system efficiency manages the temperature of the refrigerant, depending on the situations, by selectively operating the auxiliary heat exchanger 15 through the plurality of switch valves 16, thereby improving the cooling and warming performance.

In addition, the auxiliary heat exchanger 15 is configured to exchange heat with outside air. Thus, the temperature of the refrigerant is efficiently managed, and the structure of the auxiliary heat exchanger 15 is simplified.

As described above, although specific implementations of the present disclosure have been described and illustrated, those skilled in the art will appreciate that various alternations and modifications are possible without departing from the technical spirit of the present disclosure as disclosed in the appended claims.

What is claimed is:

1. An integrated thermal management system comprising:
    a refrigerant circuit configured to circulate refrigerant, the refrigerant circuit comprising a compressor, a first refrigerant heat exchanger, an expansion valve, a second refrigerant heat exchanger, an auxiliary heat exchanger, and a plurality of switch valves; and
    a coolant circuit configured to circulate coolant, the coolant circuit being configured to control air conditioning or a component temperature by heat-exchange between the coolant and the refrigerant in the first refrigerant heat exchanger or the second refrigerant heat exchanger,
    wherein the auxiliary heat exchanger is configured to operate with the first refrigerant heat exchanger and the second refrigerant heat exchanger to thereby control a temperature of the refrigerant through a heat exchange medium, the heat exchange medium being different from the refrigerant or being controlled to a temperature different from the temperature of the refrigerant,
    wherein the plurality of switch valves are configured to selectively supply the refrigerant from the first refrigerant heat exchanger or the second refrigerant heat exchanger selectively flowing to the auxiliary heat exchanger, and
    wherein the coolant circuit comprises:
        a first coolant line comprising (i) a first coolant heat exchanger configured to exchange heat with the first refrigerant heat exchanger and (ii) a first indoor heat exchanger configured to adjust a temperature of conditioned air by heat exchange with the coolant.

2. The integrated thermal management system of claim 1, wherein the auxiliary heat exchanger is configured to adjust the temperature of the refrigerant through outside air.

3. The integrated thermal management system of claim 1, wherein the coolant circuit further comprises:
    a second coolant line comprising (i) a second coolant heat exchanger configured to exchange heat with the second refrigerant heat exchanger, (ii) an outdoor heat exchanger configured to adjust a temperature of the coolant, and (iii) a second indoor heat exchanger configured to adjust the temperature of the conditioned air.

4. The integrated thermal management system of claim 3, further comprising:
    a third coolant line that is branched from the first coolant line and comprises a battery; and
    a fourth coolant line that is branched from the first coolant line and comprises a PE (Power Electronics), a first radiator, and a first valve.

5. The integrated thermal management system of claim 4, wherein the third coolant line is connected to the first coolant line,
    wherein the integrated thermal management system further comprises:
        a second valve and a third valve that are disposed between the first coolant line and the third coolant line; and
        a fifth coolant line that comprises a second radiator and is connected to the third coolant line.

6. The integrated thermal management system of claim 4, wherein the second coolant line is connected to the third coolant line,
    wherein the integrated thermal management system further comprises:
        a third valve and a fourth valve that are disposed between the second coolant line and the third coolant line; and
        a fifth valve disposed at the second coolant line and configured to selectively provide the coolant from the second coolant heat exchanger to the outdoor heat exchanger or the battery.

7. The integrated thermal management system of claim 5, wherein the auxiliary heat exchanger is arranged rearward relative to the outdoor heat exchanger, the first radiator, and the second radiator.

8. An integrated thermal management system comprising:
    a refrigerant circuit configured to circulate refrigerant, the refrigerant circuit comprising a compressor, a first refrigerant heat exchanger, an expansion valve, a second refrigerant heat exchanger, an auxiliary heat exchanger, and a plurality of switch valves; and
    a coolant circuit configured to circulate coolant, the coolant circuit being configured to control air conditioning or a component temperature by heat-exchange between the coolant and the refrigerant in the first refrigerant heat exchanger or the second refrigerant heat exchanger,
    wherein the auxiliary heat exchanger is configured to operate with the first refrigerant heat exchanger and the second refrigerant heat exchanger to thereby control a temperature of the refrigerant through a heat exchange medium, the heat exchange medium being different from the refrigerant or being controlled to a temperature different from the temperature of the refrigerant,
    wherein the plurality of switch valves are configured to selectively supply the refrigerant from the first refrigerant heat exchanger or the second refrigerant heat exchanger selectively flowing to the auxiliary heat exchanger,
    wherein the refrigerant circuit comprises:
        a main refrigerant line comprising the compressor, the first refrigerant heat exchanger, the expansion valve, and the second refrigerant heat exchanger, and
        an auxiliary refrigerant line that is branched from the main refrigerant line and comprises the auxiliary heat exchanger and the plurality of switch valves, and wherein the plurality of switch valves comprises:
a first switch valve disposed at a first side of the auxiliary heat exchanger on the auxiliary refrigerant line; and
a second switch valve disposed at a second side of the auxiliary heat exchanger on the auxiliary refrigerant line.

9. The integrated thermal management system of claim 8, wherein the first switch valve comprises a plurality of first ports that are connected to the auxiliary heat exchanger, a rear end of the first refrigerant heat exchanger, and a rear end of the second refrigerant heat exchanger, respectively, and
wherein the second switch valve comprises a plurality of second ports that are connected to a front end of the auxiliary heat exchanger, a front end of the expansion valve, and a front end of the first refrigerant heat exchanger, respectively.

10. The integrated thermal management system of claim 9, wherein the plurality of second ports of the second switch valve are configured to expand the refrigerant.

11. The integrated thermal management system of claim 9, wherein the first switch valve and the second switch valve are configured to, in a normal mode, be controlled to circulate the refrigerant along the main refrigerant line.

12. The integrated thermal management system of claim 9, wherein the first switch valve is configured to, based on cooling being performed in a hybrid mode, be opened to thereby enable fluid communication between (i) one of the plurality of first ports connected to the auxiliary heat exchanger and (ii) another of the plurality of first ports connected to the rear end of the first refrigerant heat exchanger,
wherein the second switch valve is configured to, based on cooling being performed in the hybrid mode, be opened to thereby enable fluid communication between (i) one of the plurality of second ports connected to the auxiliary heat exchanger and (ii) another of the plurality of second ports connected to the front end of the first refrigerant heat exchanger, the one of the plurality of second ports connected to the auxiliary heat exchanger being fully opened.

13. The integrated thermal management system of claim 9, wherein the first switch valve is configured to, based on warming being performed in a hybrid mode, be opened to thereby enable fluid communication between (i) one of the plurality of first ports connected to the auxiliary heat exchanger and (ii) another of the plurality of first ports connected to the rear end of the second refrigerant heat exchanger,
wherein the second switch valve is configured to, based on warming being performed in the hybrid mode, be opened to thereby enable fluid communication between (i) one of the plurality of second ports connected to the auxiliary heat exchanger and (ii) another of the plurality of second ports connected to the front end of the expansion valve communicate with each other, the one of the plurality of second ports connected to the auxiliary heat exchanger operating to expand the refrigerant.

14. An integrated thermal management system comprising:
a refrigerant circuit configured to circulate refrigerant, the refrigerant circuit comprising a compressor, a first refrigerant heat exchanger, an expansion valve, a second refrigerant heat exchanger, an auxiliary heat exchanger, and a plurality of switch valves; and
a coolant circuit configured to circulate coolant, the coolant circuit being configured to control air conditioning or a component temperature by heat-exchange between the coolant and the refrigerant in the first refrigerant heat exchanger or the second refrigerant heat exchanger,
wherein the auxiliary heat exchanger is configured to operate with the first refrigerant heat exchanger and the second refrigerant heat exchanger to thereby control a temperature of the refrigerant through a heat exchange medium, the heat exchange medium being different from the refrigerant or being controlled to a temperature different from the temperature of the refrigerant,
wherein the plurality of switch valves are configured to selectively supply the refrigerant from the first refrigerant heat exchanger or the second refrigerant heat exchanger selectively flowing to the auxiliary heat exchanger,
wherein the refrigerant circuit comprises:
a first refrigerant line comprising the compressor and the first refrigerant heat exchanger;
a second refrigerant line comprising the expansion valve and the second refrigerant heat exchanger, and
a third refrigerant line connected to the first refrigerant line and the second refrigerant line, the third refrigerant line comprising the auxiliary heat exchanger,
wherein the plurality of switch valves are respectively disposed (i) between the third refrigerant line and the first refrigerant line and (ii) between the third refrigerant line and the second refrigerant line,
wherein the plurality of switch valves comprise a third switch valve and a fourth switch valve,
wherein the third switch valve comprises a plurality of third ports that are connected to the first refrigerant heat exchanger, the expansion valve, a first side of the auxiliary heat exchanger, and a second side of the auxiliary heat exchanger, respectively, and
wherein the fourth switch valve comprises a plurality of fourth ports that are connected to a front end of the compressor, the second refrigerant heat exchanger, the first side of the auxiliary heat exchanger, and the second side of the auxiliary heat exchanger, respectively.

15. The integrated thermal management system of claim 14, wherein the third switch valve is configured to, in a normal mode, be opened to thereby enable fluid communication between (i) one of the plurality of third ports connected to the first refrigerant heat exchanger and (ii) another of the plurality of third ports connected to the expansion valve, and
wherein the fourth switch valve is configured to, in the normal mode, be opened to thereby enable fluid communication between (i) one of the plurality of fourth ports connected to the second refrigerant heat exchanger and (ii) another of the plurality of fourth ports connected to the compressor communicate.

16. The integrated thermal management system of claim 14, wherein the third switch valve is configured to, based on cooling being performed in a hybrid mode, be opened to thereby enable (A) fluid communication between (i) one of the plurality of third ports connected to the first refrigerant heat exchanger and (ii) another of the plurality of third ports connected to the first side of the auxiliary heat exchanger and (B) fluid communication between (i) another of the plurality of third ports connected to the second side of the auxiliary heat exchanger and (ii) another of the plurality of third ports connected to the expansion valve, and wherein the fourth switch valve is configured to, based on cooling being performed in the hybrid mode, be opened to thereby enable fluid communication between (i) one of the plurality of fourth ports connected to the second refrigerant heat exchanger and (ii) another of the plurality of fourth ports connected to the compressor.

17. The integrated thermal management system of claim 14, wherein the third switch valve is configured to, based on warming being performed in a hybrid mode, be opened to thereby enable fluid communication between (i) one of the plurality of third ports connected to the first refrigerant heat exchanger and (ii) another of the plurality of third ports connected to the expansion valve, and wherein the fourth switch valve is configured to, based on warming being performed in the hybrid mode, be opened to thereby enable (A) fluid communication between (i) one of the plurality of fourth ports connected to the second refrigerant heat exchanger and (ii) another of the plurality of fourth ports connected to the second side of the auxiliary heat exchanger and (B) fluid communication between (i) one of the plurality of fourth ports connected to the first side of the auxiliary heat exchanger and (ii) another of the plurality of fourth ports connected to the compressor.

* * * * *